United States Patent [19]
Wells

[11] 3,759,019
[45] Sept. 18, 1973

[54] CANTILEVER MOTOR MOUNTING AND BRUSH HOLD-DOWN

[75] Inventor: Kenneth R. Wells, Joppa, Md.

[73] Assignee: The Black and Decker Manufacturing Company, Towson, Md.

[22] Filed: Sept. 6, 1972

[21] Appl. No.: 286,546

Related U.S. Application Data

[63] Continuation of Ser. No. 72,371, Sept. 15, 1970, abandoned.

[52] U.S. Cl.......... 56/10.5, 56/249, 310/91
[51] Int. Cl............................ A01d 53/02
[58] Field of Search............. 56/16.7, 10.5, 249, 56/320.1, 320.2, 17.5, 199; 310/91

[56] References Cited
UNITED STATES PATENTS

| 1,917,782 | 7/1933 | Vachon | 56/199 X |
| 3,432,705 | 3/1969 | Lindtveit | 310/91 |
| 3,203,353 | 8/1965 | Ruby | 310/91 X |
| 3,304,275 | 5/1962 | Happe et al. | 56/17.5 X |
| 3,176,454 | 4/1965 | Jepson et al. | 56/249 |

Primary Examiner—Louis G. Mancene
Assistant Examiner—J. N. Eskovitz
Attorney—Leonard Bloom et al.

[57] ABSTRACT

An electric lawnmower including a frame supported for movement over the ground by wheels. A reel is supported upon the frame and cooperates with a bedknife to cut grass as the mower travels along the ground. An electric motor drives the reel and includes fastening means interconnecting its parts and attaching it upon the frame. In addition, the frame is constructed to accommodate different sizes (and capacities) of motors.

2 Claims, 5 Drawing Figures

PATENTED SEP 18 1973 3,759,019
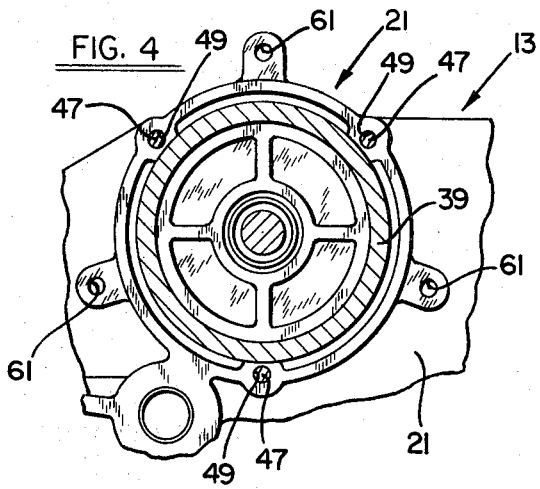
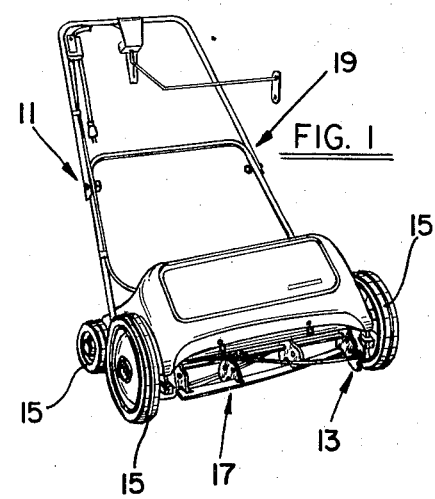
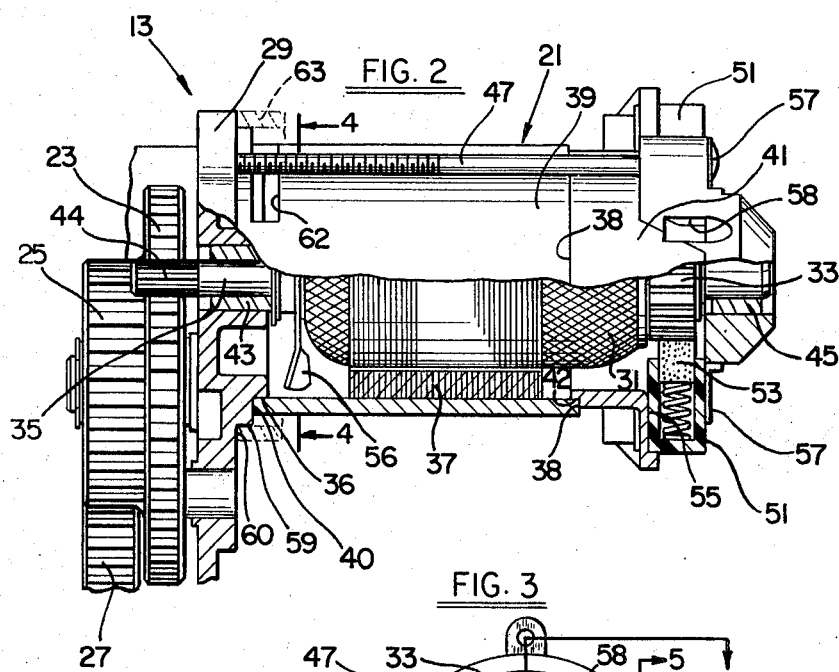
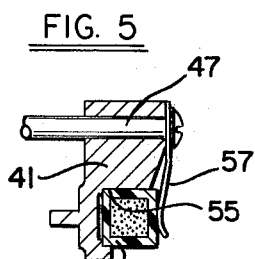
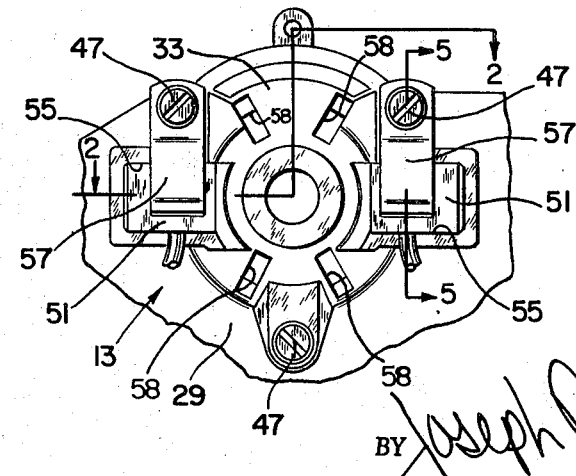
INVENTOR
KENNETH R. WELLS
BY
ATTORNEY

CANTILEVER MOTOR MOUNTING AND BRUSH HOLD-DOWN

This is a Continuation of application, Ser. No. 72,371 filed Sept. 15, 1970 now abandoned.

SUMMARY OF THE INVENTION

The present invention is directed to an electric motor assembly wherein the motor components are held together and fastened to a mounting frame by the same means. The motor assembly embodies many interchangeable parts usable in A. C. or D. C. motors, series wound or permanent magnet motors, and yet embodies both simplicity and reliability.

Main objects of the present invention, therefore, are to provide an electric motor assembly construction which simplifies the interconnection between motor parts and between the motor and its support or mount, and further, which standardizes the motor mounting arrangement for use with different sized and different types of motors.

Further important objects of this invention are to provide an improved motor construction and mount therefor of the above character which is relatively inexpensive to manufacture, embodies a minimum of separate parts, is compact, easy to assemble and disassemble, rugged in construction, and reliable and safe in use.

Other objects and advantages of this invention will become more apparent from a consideration of the detailed description to follow taken in conjunction with the drawings annexed hereto.

BRIED DESCRIPTION OF THE DRAWINGS

FIG. 1 is a perspective view illustrating an electric lawnmower which is one type of device in which the present invention finds use;

FIG. 2 is a view partly in elevation and partly in section, illustrating a motor embodying the present invention;

FIG. 3 is an end view of the structure of FIG. 2;

FIG. 4 is a sectional view of FIG. 2 taken along the line 4—4 thereof; and

FIG. 5 is a sectional view of FIG. 3 taken along the line 5—5 thereof.

BROAD STATEMENT OF THE INVENTION

Broadly described, the present invention relates to an electric lawnmower comprising a lawnmower frame having a side wall and supported for movement over the ground, a reel supported upon said frame and adapted to cut grass as said mower moves along the ground, an electric motor supported upon said frame, transmission means supported upon said frame side wall and interconnecting said motor and said reel, said motor including a rotatable armature having a shaft with one end extending through and supporting upon said side wall, said motor including a housing encasing said armature and having an open end adjacent said shaft one end and supporting said shaft at its other end, said frame side wall having means slidably fitting within open ends of different diametered housings, said frame side wall including means detachably connecting to fasteners for said different diametered housings, said shaft one end having means drivingly engaging said transmission means.

In another aspect, the present invention relates to an electric motor mounting assembly including an electric motor of the type comprising an armature including a rotatable shaft, a housing encasing said armature and having one open end, a stationary field fixed within said housing, a motor supporting member including a structural frame adapted to fit against said housing at said open end and having at least two generally concentric, annular surface portions receivable within and supporting generally cylindrical portions of different sizes of said housing, said structural frame having at least two sets of bolt receiving openings adapted to receive mounting bolts for said different sized housings, whereby to mount a selective one of said housings and said motor in cantilever fashion on said structural member.

DETAILED DESCRIPTION

Referring now specifically to the drawings, an electric lawnmower embodying the present invention is illustrated generally at 11 in FIG. 1 and is seen to include a frame 13 supported for movement over the ground by wheels 15. A reel 17 is supported on the frame 13 and is adapted to cut grass when rotated and moved along the ground. An upstanding handle 19 is fixed to the frame 13 and facilitates control and manipulation of the mower by the operator.

The reel 17 of the illustrated mower 11 is powered by an electric motor through a gear transmission. As shown in FIG. 2, this motor, generally indicated at 21, and transmission gears 23, 25, 27, are supported upon a side wall 29 of the frame 13. For reasons which will be apparent hereinafter, the component parts of the motor 21 are interconnected and are fastened to the frame side wall 29 in a novel manner.

Turning now to FIGS. 2-5, the motor 21 has an armature made up of windings 31, a commutator 33, and a shaft 35 all disposed within a stationary field 37. A motor housing encases the armature and includes a casing 39 and an end cap 41. The casing 39 has one end fitted on an annular boss 36 and engaged against a shoulder 40 on the side wall 29 and its other end fitted on an annular portion 42 on the end cap 41 and against a shoulder 38 thereon. The armature shaft 35 has one end extending through the side wall 29, being supported therein by a bearing 43, and is formed with gear teeth 44 which drivingly engage gear 23. The other end of the shaft 35 is supported by a bearing 45 in the end cap 41.

The casing 39 and end cap 41 are held together and secured to the side wall 29 by a plurality of (in this case three) relatively long screws 47. These screws 47 extend through the end cap 41 axially of the motor 21 and are threaded into openings 49 in the side wall 29 to axially compress the casing 39 between the end cap 41 and the side wall 29. In addition, a pair of brush holders 51, which carry brushes 53 electrically engaged with a commutator 33, are disposed in pockets 55 in the end cap 41. The brush holders 51 are retained in the pockets 55 by leaf-type springs 57 which, in turn, are held in place by the screws 47.

It will be appreciated that the components of motor 21 are held together and are secured to the structural frame 29 by the same means, that being the screws 47. This serves to minimize the cost of the motor and its mount and the space which this assembly occupies.

It will further be appreciated that it may be desirable to employ different sized and type of motors in similar type devices. Thus, for example, in a lawnmower, it may be desirable to use either a permanent magnet motor or a series wound, universal motor with the same basic mower. The former may be used in a cordless battery operated mower (not shown) or if a rectifier is provided, in the illustrated corded version thereof. Generally, the permanent magnet motor is smaller, requires a relatively low initial investment (tooling), and has a relatively high efficiency and hence may be operated at low speed and eliminates the need for a motor cooling fan. However, in the rectified A. C. version shown, where motor efficiency is not as critical as it is in a cordless version of this same mower, a motor cooling fan 56 may be mounted on the shaft 35 to impel motor cooling air into the openings 58 in end cap 41, through casing 39 and out openings 62. In a cordless version, the openings 58, 62 and fan 56 may be eliminated.

On the other hand, a series wound, universal motor may be desirable in higher volume mowers (the corded version) wherein mass production techniques thereof make it the preferred form. This type of motor is generally larger in diameter than the permanent magnet motor and would therefore require a different mounting arrangement on the structural frame 29. Furthermore, this type of motor has a lower efficiency than the permanent magnet motor so that it must operate at a higher speed thereby requiring a motor cooling fan. The use of a fan, of course, necessitates a longer motor housing.

To accommodate these differences, it is desirable that the structural frame 29 be constructed to readily accept a larger diameter motor housing as well as one of longer axial length. To this end, the side wall 29 has an annular surface 59 surrounding the shoulder 40 and adapted to snugly receive a larger diameter motor casing 63. One end of that casing 63 seats against a shoulder 60 adjacent the surface 59 while the other end is fitted onto a larger version of the end cap 41. Screws 47 extend through the end cap and are threaded into openings 61 in the structural frame 29 to hold the motor components together and secured to the side frame 29. In the case of a motor housing of longer axial length, longer screws are substituted for screws 47.

Thus, it will be appreciated that the same basic construction, including the side frame 29, is used for different mower versions, and that this side frame 29 readily accommodates the different motors used therewith.

By the foregoing, there has been disclosed an improved motor housing construction calculated to fulfill the inventive objects set forth hereinabove, and while a preferred embodiment of the present invention has been illustrated and described in detail, various additions, substitutions, modifications and omissions may be made thereto without departing from the spirit of the invention.

I claim:

1. An electric lawnmower comprising a lawnmower frame having a side wall supported for movement over the ground, a reel supported upon said frame and adapted to cut grass as the mower moves along the ground, an electric motor supported upon said frame, transmission means supported upon said frame side wall and interconnecting said motor and said reel, said motor including a rotatable armature having a shaft with one end extending through and supported upon said side wall, said motor including a housing encasing said armature and having an open end adjacent said shaft one end and supporting said shaft at its other end, said frame side wall having means slidably fitting within open ends of different diametered housings, said frame side wall including means detachably connecting to fasteners for said different diametered housings, said shaft one end having means drivingly engaging said transmission means.

2. An electric motor mounting assembly including an electric motor of the type comprising an armature including a rotatable shaft, a housing encasing said armature and having one open end, a stationary field fixed within said housing, a motor supporting member including a structural frame adapted to fit against said housing at said open end and having at least two generally concentric, annular surface portions receivable within and supporting generally cylindrical portions of different sizes of said housing, said structural frame having at least two sets of bolt receiving openings adapted to receive mounting bolts for said different sized housings, whereby to mount a selected one of said housings and said motor in cantilever fashion on said structural member.

* * * * *